(12) United States Patent
Allan et al.

(10) Patent No.: US 6,333,798 B1
(45) Date of Patent: Dec. 25, 2001

(54) BIDIRECTIONAL WDM OPTICAL COMMUNICATION NETWORK

(75) Inventors: Graham R. Allan, Columbia; Gary Duerksen, College Park; Patrick Foy, Gaithersbug, all of MD (US)

(73) Assignee: Seneca Networks, Inc., Rockville, MD (US)

( * ) Notice: Subject to any disclaimer, the term of this patent is extended or adjusted under 35 U.S.C. 154(b) by 0 days.

(21) Appl. No.: 09/781,169

(22) Filed: Feb. 13, 2001

(51) Int. Cl.[7] .................................................. H04J 14/02
(52) U.S. Cl. ........................................ 359/127; 359/130
(58) Field of Search ......................... 359/177, 127, 359/130, 110, 125, 119

(56) References Cited

U.S. PATENT DOCUMENTS

| | | | |
|---|---|---|---|
| 5,633,741 | * 5/1997 | Giles | 359/124 |
| 5,715,076 | 2/1998 | Alexander et al. | 359/130 |
| 5,742,416 | 4/1998 | Mizrahi | 359/134 |
| 5,784,184 | 7/1998 | Alexander et al. | 359/125 |
| 5,812,306 | 9/1998 | Mizrahi | 359/341 |
| 5,875,054 | * 2/1999 | Onoda et al. | 359/341 |
| 5,926,590 | 7/1999 | Mao | 385/24 |
| 5,959,749 | 9/1999 | Danagher et al. | 359/124 |
| 6,038,046 | 3/2000 | Kaneko et al. | 359/130 |
| 6,061,484 | 5/2000 | Jones et al. | 385/24 |
| 6,072,614 | * 6/2000 | Roberts | 359/177 |
| 6,081,368 | * 6/2000 | Delavaux | 359/341 |
| 6,091,869 | 7/2000 | Sundelin | 385/24 |
| 6,101,016 | 8/2000 | Roberts et al. | 359/177 |
| 6,115,157 | 9/2000 | Barnard et al. | 359/124 |
| 6,122,095 | 9/2000 | Fatehi | 359/337 |
| 6,122,096 | 9/2000 | Fatehi | 359/341 |
| 6,130,765 | 10/2000 | Gautheron et al. | 359/127 |
| 6,134,034 | 10/2000 | Terahara | 359/124 |
| 6,144,474 | 11/2000 | Nitta et al. | 359/179 |
| 6,157,481 | 12/2000 | Sugaya et al. | 359/337 |
| 6,160,649 | 12/2000 | Horiuchi et al. | 359/110 |
| 6,160,658 | 12/2000 | Ishikawa | 359/337 |
| 6,160,660 | 12/2000 | Aina et al. | 359/341 |
| 6,166,838 | 12/2000 | Liu et al. | 359/128 |
| 6,166,850 | 12/2000 | Roberts et al. | 359/341 |
| 6,204,960 | * 3/2001 | Desurvire | 359/341 |
| 6,243,177 | * 6/2001 | Duerksen | 359/127 |
| 6,246,515 | * 6/2001 | Cereo et al. | 359/345 |

FOREIGN PATENT DOCUMENTS

| | | |
|---|---|---|
| 0973276 | 1/2000 | (EP) . |
| 10-135546 | 5/1998 | (JP) . |
| 10-190107 | 7/1998 | (JP) . |

\* cited by examiner

*Primary Examiner*—Leslie Pascal
(74) *Attorney, Agent, or Firm*—Margaret A. Burke

(57) ABSTRACT

The present invention provides a bidirectional wavelength division multiplexed optical communication network useful in numerous network configurations. The network includes a bidirectional optical waveguide carrying counter-propagating wavelength division multiplexed optical signals each including plural channels. Several optical nodes are positioned along the bidirectional optical waveguide, each of which includes an optically-amplified bidirectional optical add-drop multiplexer. Each bidirectional optical add-drop multiplexer includes channel selectors for selecting at least one optical channel from each of the counter-propagating WDM optical signals. Each optical node further includes at least one optical transmitter for supplying an optical channel to be added by the bidirectional optical add-drop multiplexer to the bidirectional optical waveguide and at least one optical receiver for receiving an optical channel dropped from the bidirectional optical waveguide by the bidirectional add-drop multiplexer. Preferably, each optical node includes a bidirectional optical service channel transmitter and receiver and a network control element. Through measurement of optical launch powers and optical amplifier gain, the optical power levels of the optical channels are controlled to within a specified range. The bidirectional optical systems of the present invention can be used to create flexible network topologies that are easily expandable to include additional optical nodes and have particular application in metropolitan area networks.

10 Claims, 2 Drawing Sheets

BIDIRECTIONAL WDM OPTICAL COMMUNICATION NETWORK

BACKGROUND OF THE INVENTION

1. Field of the Invention

The invention is directed to wavelength division multiplexed (WDM) optical communication systems in general and, more particularly, to bidirectional WDM optical networks having optically-amplified bidirectional add-drop multiplexer nodes including an optical network control element for controlling optical launch powers.

2. Description of the Related Art

As the need for communication signal bandwidth increases, wavelength division multiplexing (WDM) has progressively gained popularity for multiplying the transmission capacity of a single optical fiber. A review of optical networks, including WDM networks, can be found in Ramaswami et al., *Optical Networks: A Practical Perspective* (Morgan Kaufman,© 1998), the disclosure of which is incorporated herein by reference. Typically, wavelength division multiplexed optical communication systems have been designed and deployed in the long-haul, interexchange carrier realm. In these long-haul optical systems, a wavelength division multiplexed optical communication signal comprising plural optical channels at different wavelengths travels in a single direction on a single fiber (unidirectional transmission). Because the communication traffic in such systems commonly travels many hundreds of kilometers, the need for add-drop multiplexing of individual channels is infrequent (if at all), occurring at widely-spaced add-drop nodes.

Although the optical infrastructure of long-haul WDM optical systems can accommodate future traffic needs created by increased demand from traditional and multimedia Internet services, this traffic must first be collected and distributed by local networks. Currently, such local networks are structured to carry a single wavelength, time-division multiplexed (TDM) optical signal along a fiber network organized into various ring structures. To route the various components of the TDM signal, numerous electronic add-drop multiplexers are positioned along the fiber network. At each add-drop location, the entire optical signal is converted into an electrical signal; the portions of the electrical signal which are destined for that add-drop point are routed accordingly. The remaining portions of the electrical signal are converted back to a new TDM optical signal and are output through the electronic add-drop multiplexer. Thus, before a user can access the bandwidth-rich WDM long-haul transport networks, he must first pass through the bottleneck of the local networks.

Although unidirectional WDM optical systems are suitable for conventional long-haul interexchange carrier markets, metropolitan (local) communications systems require extensive routing and switching of traffic among various nodes positioned within interconnecting optical fiber rings. Consequently, smaller metropolitan markets require considerably more extensive add-drop multiplexing in order to successfully implement wavelength division multiplexing in their short-range systems. In conventional, point-to-point (e.g., long-haul) optical systems, the optical channels are launched from a single starting location and aggregated onto an optical fiber through the use of an optical combiner. Such systems are depicted in U.S. Pat. Nos. 5,504,609, 5,715,076, and 5,784,184. However, in metropolitan networks, particularly metropolitan ring networks, it is desirable to continuously add and drop optical channels simultaneously from multiple points around an optical ring. Thus, there is no "start" or "end" node in such a metropolitan network as in the prior art point-to-point networks.

Further, in order to maximize the effectiveness of wavelength division multiplexing in metropolitan networks, it would be useful to implement bidirectional WDM optical systems, e.g., to enhance network design flexibility and reduce the number of optical fibers needed to implement protection switching. In a bidirectional WDM system, counter-propagating WDM optical signals, each comprised of plural optical channels, are carried on the same waveguiding medium such as a single optical fiber. Implementation of a bidirectional system requires several considerations not present in conventional unidirectional optical systems. Add-drop multiplexing in a bidirectional optical environment becomes considerably more complex since optical channels must be selected from each of the counter-propagating WDM optical signals. Optical amplification also becomes more complex in a bidirectional optical network since amplification must be performed on each of the counter-propagating WDM signals. When the bidirectional system is deployed in a metropolitan network, the positioning of optical amplifiers is difficult due both to geographic (space) constraints for positioning optical nodes at irregular intervals and the need for the network to accommodate future expansion (e.g., future add-drop). When additional nodes are added to an existing WDM metropolitan network, the number and placement of optical amplifiers must be reconfigured to conform to the optical power budget for the new network.

Several bidirectional multiplexer designs have been proposed as well as several designs for bidirectional amplifiers; however, none of these permit the creation of easily reconfigurable or expandable bidirectional wavelength division multiplexed optical networks. In U.S. Pat. No. 5,909,295, optical circulators are used to separate the counter-propagating optical signals that are further filtered down to individual channel wavelengths; this design appears to be predominantly directed to an end node in a WDM optical system. In many embodiments, expensive four-port (or higher) optical circulators must be used. Although optical channels are separated, there is no teaching or suggestion of signal recombination such that a bidirectional optical signal continues to propagate along a bidirectional transmission waveguide.

In U.S. Pat. No. 6,130,765 a bidirectional add-drop multiplexer is described. The apparatus comprises two three-port main circulators inserted into a line fiber; the third port of each circulators connected by auxiliary optical fibers to auxiliary circulators. While this patent depicts channel routing in a single bidirectional line fiber, it does not teach or suggest an optically-amplified bidirectional optical network.

Bidirectional optical amplifiers are also known in the art for use in conventional, point-to-point optical networks. Bidirectional optical amplifiers are shown in U.S. Pat. Nos. 5,742,416, 5,812,306, 6,101,016. In these patents optical signals are routed unidirectionally through a single optical amplifier or separated and routed through separate amplifiers. However, because these optical amplifiers are designed for use in point-to-point optical systems, they do not include any mechanism for adding and dropping optical traffic onto the optical network at the position of the bidirectional amplifiers.

Thus, there is a need in the art for a bidirectional WDM optical communication network capable of supporting add-drop multiplexing and optical amplification while permitting network expansion with future optical add-drop multiplexer nodes. Such systems would permit effective implementation of bidirectional wavelength division multiplexing in local, metropolitan markets requiring high volumes of signal re-routing and allow creation of flexible network topologies.

SUMMARY OF THE INVENTION

The present invention provides a bidirectional wavelength division multiplexed optical communication network useful in numerous network configurations. The network includes a bidirectional optical waveguide carrying a first wavelength division multiplexed optical signal comprising a plurality of first optical channels propagating in a first direction and carrying a second wavelength division multiplexed optical signal comprising a plurality of second optical channels propagating in a second direction. Plural optical nodes are positioned along the bidirectional optical waveguide, each of which includes an optically-amplified bidirectional optical add-drop multiplexer. Each bidirectional optical add-drop multiplexer includes a first channel selector for selecting at least one optical channel from the first wavelength division multiplexed optical signal and at least a second channel selector for selecting at least one optical channel from the second wavelength division multiplexed optical signal. Each optical node includes at least one optical transmitter for supplying an optical channel to be added by the bidirectional optical add-drop multiplexer to the bidirectional optical waveguide and at least one optical receiver for receiving an optical channel dropped from the bidirectional optical waveguide by the bidirectional add-drop multiplexer.

Preferably, each optical node includes a bidirectional optical service channel transmitter and receiver and a network control element. Through measurement of optical launch powers, optical amplifier gain, and received powers, the optical power levels of the optical channels are controlled to within a specified range.

DETAILED DESCRIPTION

Figure 1:
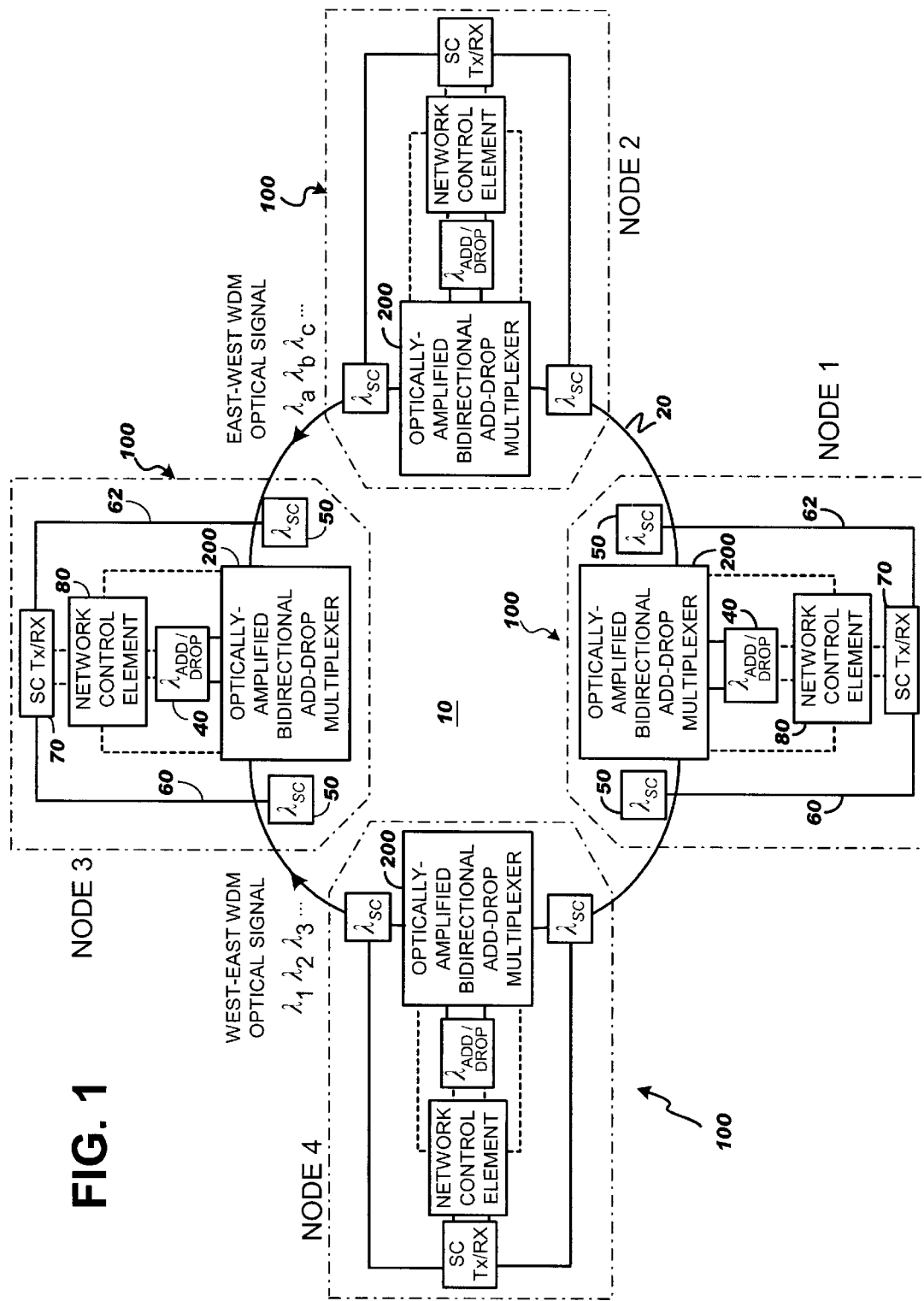
FIG. 1 is a schematic illustration of a bidirectional optical network according to one embodiment of the present invention.

Turning to the drawings in detail in which like numerals indicate the same or similar elements in each of the several views, FIG. 1 depicts a bidirectional optical network 10 according to one embodiment of the present invention. The bidirectional network includes at least one bidirectional optical transmission waveguide 20. Bidirectional optical transmission waveguide 20 is configured to carry two counter-propagating wavelength division multiplexed optical communication signals, each WDM signal comprised of plural optical channels at different wavelengths. In accordance with traditional industry nomenclature, one of the WDM signals propagating in a first direction is designated the west-east WDM signal while the WDM signal propagating in the opposite direction is designated the east-west WDM signal. The individual optical channels in the west-east WDM optical signal are denoted by the symbols $\lambda_1$, $\lambda_2$, $\lambda_3$ etc., while the individual optical channels in the east-west WDM optical signal are denoted by the symbols $\lambda_a$, $\lambda_b$, $\lambda_c$, etc. for clarity of presentation. As used herein, the expression "wavelength division multiplexed" or "WDM" refers to any optical system or signal composed of plural optical channels having different wavelengths, regardless of the number of channels in the system or signal. As such, the term "wavelength division multiplexing" or "WDM" encompasses all categories of WDM such as DWDM (dense wavelength division multiplexing) and CWDM (coarse wavelength division multiplexing).

It is noted that although bidirectional optical network 10 of FIG. 1 is depicted as an optical ring network, the present invention may be employed using any configuration of bidirectional waveguide or waveguides, each of which carries two counter-propagating WDM optical signals including plural channels. Examples of other network topologies in which the present invention may be employed include mesh networks, point-to-point networks, subtended ring networks, or any other network topology having at least one bidirectional optical waveguide. Although not shown in FIG. 1, it is common for ring topologies to include at least two alternate optical paths—a "work" path and a "protect" path. Only one path is depicted in FIG. 1 although it is understood that at least an additional path may be provided in bidirectional network 10. The term "optical network," as used herein, describes any optical system that includes at least one optical signal generator, at least one optical receiver, and an optical transmission medium such as an optical waveguide. Such a network may carry various types of information traffic, including, but not limited to, audio, video, data, and voice traffic encoded on optical channels.

Interposed along bidirectional optical waveguide 20 are a series of optical nodes 100. Optical nodes 100 include optically-amplified bidirectional add-drop multiplexers 200. In the ring configuration of FIG. 1, there are no terminating nodes; optical traffic is continually add/dropped at each of the optical nodes. Because bidirectional add-drop multiplexers 200 are optically-amplified, line optical amplifiers are typically not required for numerous short-haul applications such as metropolitan networks. Add/drop channel module 40 transmits optical channels to be added to the bidirectional add-drop multiplexer and receives dropped optical channels. Numerous configurations may be provided for the add/drop module 40 as are known in the art (and which may include plural optical modules including short-reach interfaces such as optical transponders). Exemplary embodiments for optical channel transmitters and receivers, including configurations in which data of multiple formats may be placed on individual optical channels is depicted in assignee's copending patent application Ser. No. 09/688,804 filed Oct. 17, 2000, entitled "WDM Optical Communication System With Channels Supporting Multiple Data Formats," the disclosure of which is incorporated by reference herein. The optical channels added by bidirectional add-drop multiplexers 200 may originate at add-drop module(s) 40 or they may be routed to the optical node from another portion of the optical network or from another optical network. Similarly, the optical channels dropped by the bidirectional add-drop multiplexers 200 may terminate at add-drop module(s) 40 or they may be routed to other portions of the same optical network or to different optical networks.

Optical nodes 100 further include add/drop ports 50 for add/dropping optical service channels, discussed in further detail below. Optical service channels add/dropped by ports 50 are transported along optical paths 60 and 62 to optical service channel transmitter/receiver module 70. A detailed description of bidirectional service channel configurations suitable for use in the optical networks of the present invention is found in assignee's copending U.S. patent application Ser. No. 09/742,220, filed Dec. 22, 2000, the disclosure of which is incorporated by reference herein.

Typically, the service channel add-drop module includes one or two receivers for receiving the service channel in each direction and one transmitter coupled to an optical splitter for transmitting the service channel in each direction (alternatively, two transmitters may be employed).

At each optical node, a network control element 80 is provided. Although network control element 80 is schematically depicted as a single module in FIG. 1, it is understood that network control element features may reside in plural locations at any given optical node. As will be discussed in further detail below, network control element 80 receives information from numerous sources such as the service channel transmitter/receiver module 70, the optical channel add/drop module(s) 40, and the optically amplified bidirectional add-drop multiplexer 200. In this manner, the network control element may dynamically manage many aspects of the optical network including, but not limited to, optical channel launch power, optical amplifier gain, reconfiguration of the add-drop multiplexer, status of the optical node, etc. Through the use of the network control element to control optical channel strength and the optically-amplified bidirectional add-drop multiplexers, the need for line amplifiers is eliminated or reduced; consequently, additional nodes can be added to an optical network without the need for reconfiguring existing optical nodes or other network elements.

Figure 2:
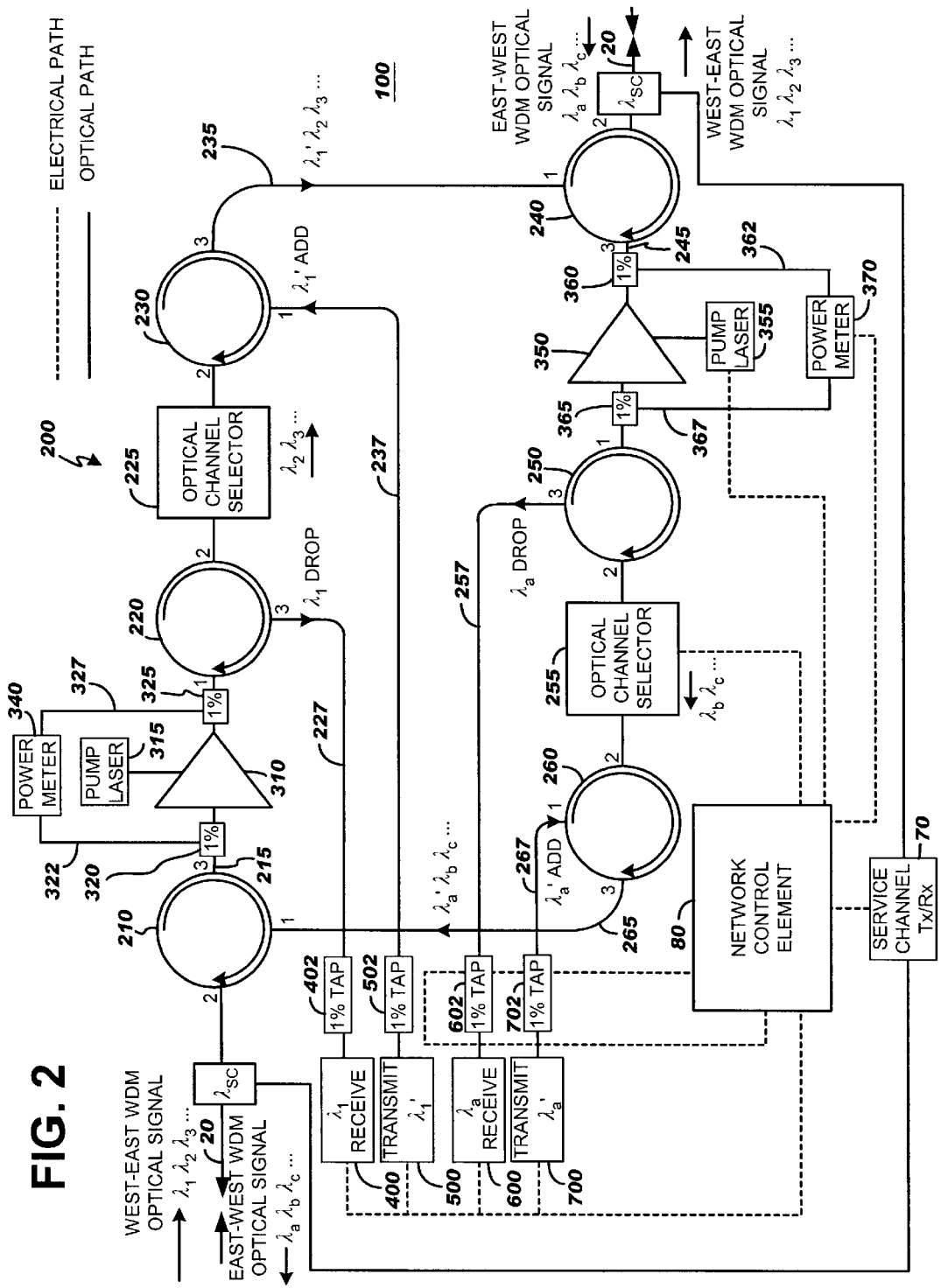
FIG. 2 is a schematic illustration of an optical node in the bidirectional optical network of the present invention.

Turning to FIG. 2, optical node 100 is shown in further detail. The bidirectional optical add-drop multiplexer 200 includes six three-port optical circulators, 210, 220, 230, 240, 250, and 260. In each of these three-port circulators, optical signals entering the first optical port of the circulator are Faraday rotated to exit the second optical port. Similarly, optical signals entering the second optical port exit through the third optical port. Optionally, the circulators can be configured such that signals entering the third optical port exit through the first optical port. The operation of optical circulators is discussed in *Optical Networks: A Practical Perspective,* incorporated by reference above. In the present invention, any device which is capable of transferring optical signals among plural input and output ports may be used for elements 210, 220, 230, 240, 250, and 260 in the bidirectional add-drop multiplexer. Three-port optical circulators such as those depicted in FIG. 1 are commercially available from a variety of sources including E-Tek, JDS Uniphase, AOC Technologies, and Tokin and will not be further described here.

As seen in FIG. 2, the west-east WDM optical signal enters optical port 2 of circulator 210 where it is output to optical path 215. Any medium capable of carrying a WDM optical signal may be used as an optical path; typically an optical fiber or other waveguiding medium is employed (e.g., Corning SMF-28, LEAF®, etc.). Optical path 215 optically communicates with optical amplifier 310. As used herein, the expression "optically communicates" designates an optical path between two elements. The optical path may be a direct path or it may route through intermediate optical devices (e.g., optical isolators, additional optical circulators, filters, amplifiers, etc.). The particular optical amplifier selected is not critical; optical amplifiers 310 may be selected from any device capable of optically amplifying an optical signal without the need for conversion to an electrical signal. Such devices include, but are not limited to, doped fiber amplifiers (e.g., erbium-doped fiber amplifiers), semiconductor optical amplifiers, Raman optical amplifiers, etc. Particulars of various optical amplifiers may be found in Chapter 3 of *Optical Networks: A Practical Perspective,* incorporated by reference above. In the configuration depicted in FIG. 2, the selected optical amplifier is a single-stage erbium-doped fiber amplifier having a single pump laser 315 although it is understood that plural stage fiber-based optical amplifiers having more that one optical pumping source may also be employed as optical amplifier 310.

Depending upon the selected channel plan for the overall optical network, each optical amplifier may be customized for optimal gain flatness in the wavelength region of the selected channels. For example, if the west-east WDM signal includes only optical channels within the C-band (nominally defined as wavelengths from approximately 1530–1565 nm), then amplifier 310 would be optimized to provide as flat a gain profile as possible across those wavelengths. Conversely, if the east-west WDM signal includes only optical channels within the L band (nominally defined as wavelengths from approximately 1565 (plus or minus about 5 nm) to approximately 1610 nm), then amplifier 350 would be optimized to provide an adequately flat gain profile across those wavelengths.

Optical taps 320 and 325 are positioned before and after optical amplifier 310. In the depicted embodiment, 1% taps are employed; however, other tap percentages may be selected. Optical taps 320 and 325 divert a portion of the west-east WDM optical signal along optical paths 322 and 327, respectively, towards optical power meter module 340. Optical power meter module 340 may include one or more optical power meters to measure signal strength before and after amplification, indicating the gain of the optical amplifier.

The optically-amplified WDM signal enters the first port of circulator 220. Upon entering the first port of circulator 220, the west-east optical channels are transferred to output port 2. Output port 2 of circulator 220 optically communicates with optical channel selector 225. Upon encountering optical selector 225, one or more channels to be dropped from the west-east WDM signal are selected and routed back towards the second optical port of circulator 220. The remaining optical channels of the west-east WDM signal, i.e., the "through" channels $\lambda_2, \lambda_3 \ldots$, are routed towards first optical port of circulator 230. In the example depicted in FIG. 1, channel $\lambda_1$ is selected by channel selector 225 and routed back through optical port 2 where it is "dropped" at optical port 3 of circulator 220 onto optical path 227. From there, the selected optical channel may be routed directly to receiver 400 as shown or it may be directed to another bidirectional (or unidirectional) optical system (e.g., an optical ring network serving a different geographical region). In this manner, individual optical channels may be leased/contracted to individual customers for exclusive use by that customer.

As the through optical channels are routed towards circulator 230, they enter the second optical port and exit through the third optical port onto output path 235. If it is desired to add one or more optical channels to the west-east WDM optical signal, the "add" channels are input via optical path 237 to the third optical circulator 230. The added channels are output through optical port 2 of circulator 230 where they are re-routed by optical channel selector 225 back through port 2 of circulator 230, exiting through port 3 onto optical path 235 along with "through" optical channels of the west-east WDM optical signal. The add channels may be produced by local optical transmitter 500 or they may be channels that have been routed to the bidirectional add-drop multiplexer from another optical system or from another segment of the same bidirectional optical system.

Optical transmitter 500 may, in an exemplary embodiment, form part of an optical transmission system in which plural data formats may be aggregated onto a single optical channel via TDM and cell format modules. Details of this optical transmission system may be found in assignee's copending U.S. patent application Ser. No. 09/688,804 entitled "WDM Optical Communication System With Channels Supporting Multiple Data Formats" filed Oct. 17, 2000, the disclosure of which is incorporated herein by reference. Advantageously, the use of the transmission systems from the '804 application in the bidirectional networks of the present invention permits the integration of voice and cell/packet data by an optical network, facilitating use of the present invention in metropolitan area networks.

As recognized by those of ordinary skill in the optical communication systems art, optical circulator 230 can be easily replaced by a standard optical coupler, in which event the added optical channels would not interact with optical channel selector 225 but would be directly added to the through optical channels.

Optical channel selector 225 may be selected from any static or reconfigurable optical device which is capable of separating or otherwise routing one or more optical wavelengths from a wavelength division multiplexed optical signal. Such devices include, but are not limited to, Bragg gratings (fiber and non-fiber based), tunable Bragg gratings, Fabry-Perot filters, acousto-optic tunable filters, multilayer dielectric thin film filters, arrayed waveguide gratings (AWGs) and/or combinations of these devices. Detailed descriptions of such optical selection devices are found in chapter 3 of *Optical Networks: A Practical Perspective*, incorporated by reference above. When tunable channel selection devices are employed, the network control element may be used to control the optical channel wavelength to which the selection devices are tuned; additionally, the optical service channels may carry information to the network control element for directing the wavelength to which the channel selection devices should be tuned, allowing for reconfiguration of the bidirectional optical network.

In an exemplary embodiment, optical channel selector 225 comprises a chirped Bragg grating, i.e., a grating having a distribution of refractive index perturbations whose period varies along the axis of propagation. When a chirped grating is used in channel selector 225, the dropped optical channel is given a positive or negative chirp in the process of being diffracted by the grating, while the added optical channel is given a complementary negative or positive chirp, respectively, in the process of being diffracted by the same grating in the opposite direction. A positive chirp may be introduced in the added channel to reduce nonlinear interactions as the optical channel is transported along the bidirectional optical waveguide 5. This chirp is removed when the optical channel is diffracted by a chirped grating in the next drop operation; this "pre-chirp"/"de-chirp" procedure does not affect the detected signal nor interfere with any dispersion compensation techniques that may be employed in the bidirectional add-drop multiplexer or in other parts of the bidirectional WDM optical system.

Note that channel selector 225 need not be symmetrical, i.e., it need not drop the same number of channels or the same channel wavelengths. For example, the channel selector may comprise two or more tunable Bragg gratings optionally separated by an isolator. Each of the tunable gratings may be tuned to the same or different wavelength, corresponding to the channels to be dropped and added. As long as neither tunable grating is tuned to a wavelength of one of the through channels, such an asymmetrical channel selector may be easily created allowing for dynamically reconfigurable channel selection. In an exemplary embodiment, each of the optical channel selectors at each optical node in the bidirectional network include at least two in-fiber Bragg gratings, optionally chirped, such that four optical channel pairs may be add-dropped at each optical node location. Further details of optical channel selectors and bidirectional add-drop multiplexing may be found in commonly-assigned copending U.S. patent application Ser. No. 09/677,764 filed Oct. 3, 2000, the disclosure of which is incorporated by reference herein.

As the west-east through channels and the added channels exit the third circulator onto optical path 235, they are directed towards the first optical port of the fourth optical circulator, circulator 240. As seen in FIG. 2, optical port 2 of circulator 240 forms one of the two ports directly communicating with bidirectional optical transmission waveguide 20 in which the bidirectional add-drop multiplexer has been interposed (with port 2 of first circulator 210 being the other directly-communicating port). The west-east WDM optical signal, now including the added channels, continues in the same direction of propagation along bidirectional transmission waveguide 20 as it is output through the second port of circulator 240.

As the west-east WDM signal exits the bidirectional add-drop multiplexer 200 through circulator 240 port 2, the east-west WDM optical signal simultaneously enters the bidirectional add-drop multiplexer 200 through the same port. The east-west WDM optical signal is output onto optical path 245, positioned between optical circulators 240 and 250. As with west-east WDM optical arm of bidirectional add-drop multiplexer 200, an optical amplifier 350 is interposed in optical path 245. Optical amplifier 350 may be selected from the same list of devices recited above in connection with optical amplifier 310, although it is understood that optical amplifiers 310 and 350 need not be the same type of device or even the same class of device (e.g., one amplifier may be selected to be a doped-fiber amplifier while the other amplifier may be a semiconductor optical amplifier). In the configuration depicted in FIG. 2, the selected optical amplifier is a single-stage erbium-doped fiber amplifier having a single pump laser 355. Optical taps 360 and 365 are positioned before and after optical amplifier 350 and divert a portion of the east-west WDM optical signal along optical paths 322 and 327, respectively, towards optical power meter module 370 to indicate the gain of optical amplifier 350, as with amplifier 310.

The optically-amplified east-west WDM signal next enters the first port of circulator 250 where it exits port 2 towards optical channel selector 255. Optical channel selector 255 is substantially similar to selector 225 in that it may be comprised of the optical elements set forth above. Of course, optical channel selector 255 is configured to interact with the wavelengths of the east-west WDM signal, rather that the west-east wavelengths of channel selector 225.

As with the west-east WDM optical signal, upon encountering optical selector 255, one or more channels to be dropped from the east-west WDM signal are selected and routed back towards the second optical port of circulator 250. The remaining optical channels of the east-west WDM signal, i.e., the "through" channels $\lambda_b, \lambda_c \ldots$, are routed towards the second optical port of circulator 260. In the example depicted in FIG. 2, channel $\lambda_a$ is selected by channel selector 255 and routed back through optical port 2 where it is "dropped" at optical port 3 of circulator 250 onto optical path 257. From there, the selected optical channel may be routed directly to receiver 600 as shown or it may be directed to another bidirectional (or unidirectional) optical system (e.g., an optical ring network serving a different geographical region).

As the through optical channels $\lambda_b$, $\lambda_c$ . . . are routed towards circulator 260, they enter the second optical port and exit through the third optical port onto output path 265. If it is desired to add one or more optical channels to the east-west WDM optical signal, the "add" channels are input via optical path 267 to the sixth optical circulator 260. The added channels are output through optical port 2 of circulator 260 where they are re-routed by optical channel selector 255 back through port 2 of circulator 260, exiting through port 3 onto optical path 265 along with the "through" optical channels of the east-west WDM optical signal. As with the west-east channels added and dropped, the added or dropped east-west channels may originate or terminate at local or remote locations. In the embodiment depicted in FIG. 2, the added optical channel $\lambda_{a'}$ originates at transmitter 700; as discussed above, this may be part of an optical transmission system such as that shown in the '804 patent application, incorporated by reference above.

Completing the optical path towards the bidirectional optical transmission waveguide 20, the east-west optical WDM signal, along with the added optical channels, are input to the first optical port of the first optical circulator 210, where they rejoin bidirectional waveguide 20 through the second optical port. The east-west WDM optical signal is continually output to bidirectional optical transmission waveguide 20 through port 2 of the first circulator as the west-east WDM optical signal is continually input to the bidirectional add-drop multiplexer through port 2 of the first circulator 210.

Network control element 80 provides a number of supervisory functions for various devices at each of the optical nodes as shown in FIG. 2. As shown by the dashed lines in FIG. 2, network control element 80 electrically communicates with the optical power meters, amplifier pump lasers (or semiconductor optical amplifiers or other amplifier control elements), optical transmitters, and optical receivers. As used herein, the expression "electrically communicates" designates an electrical path between one or more devices whether the path is direct or whether the path intersects one or more intervening devices. For clarity of presentation, only the electrical paths between network control element 80 and elements or devices in the lower portion of the optical node 100 are depicted; similar electrical paths are found between the network control element 80 and the corresponding elements in the upper portion of the optical node as shown in FIG. 2 (it is noted that "upper" and "lower" refer to positions in the FIG. and do not necessarily correspond to physical location in any particular optical node).

The role of network control element 80 in the process of gain equalization will now be described. Each of the optical channels is launched from an optical transmitter, such as optical transmitters 500 and 700 with a pre-set optical power based upon the overall configuration of the optical network. The optical power level is monitored by network control element 80 via optional optical taps 502 and 702 or by measurement of the photocurrents of the transmitter lasers. Similarly, the optical gain of each of the optical amplifiers is monitored via the optical taps and optical power meters, as described above. Finally, the optical power of each of the dropped optical channels is measured via optical taps 402 and 702. The optical taps optically communicate with one or more optical power meters; when a single optical power meter is used, it samples optical signals from each of the optical taps with which it communicates. When the power of a particular optical channel is substantially higher or lower than other optical channels within the WDM optical signal, the launch optical power of that optical signal is lowered or raised, respectively, to bring it to a level corresponding to that of the other optical channels. Generally, it is desirable to keep the optical power levels of the optical channels within a predetermined spread to prevent optical channels with high power levels from consuming disproportionately higher amounts of amplifier gain. In an exemplary embodiment, the range of optical powers is selected to be within a 3 dB spread among the optical channels; however, other ranges may be selected depending upon the overall configuration of the optical network. Since optical channels in a metropolitan optical network travel shorter distances than those in long haul systems, typically on the order of tens of kilometers before being dropped, the optical network is more tolerant of disparities in optical power levels among the channels. Similarly, if the optical gain of an optical amplifier at a node is too high or too low, the network control element adjusts the power to the pump lasers (or other optical amplifier elements such as semiconductor optical amplifiers) in order to correct the deficiency.

Through communication with other optical nodes via the optical service channels, the network control element receives information concerning the optical power levels of each of the optical channels in the optical network; using this information, it can communicate with network control elements at other optical nodes to ensure the proper gain adjustment of optical amplifiers and proper optical launch powers of optical transmitters at other optical nodes. Alternatively, the network control element may be used to report the optical powers measured at the optical amplifiers and/or receivers and the gain or launch powers adjusted manually; this latter embodiment is considered to be part of the means for adjusting the gain of the optical amplifier in connection with the network control element.

In an exemplary embodiment, the optical power levels of the optical channels are set and controlled as follows. In the initial start-up of a bidirectional network, all of the optical transmission sources and optical amplifiers are off. The network control element determines the number of nodes in the bidirectional network and also determines the number of operating channels that are to be brought up in the initial network start-up. Additionally, as each channel is brought on-line, the network control element of each optical node is notified of the total number of channels in operation at that moment via the optical service channel. Subsequently, the optical transmitters at node 1 (FIG. 1) which launch channels in a west-east direction are turned on to a preset initial value, typically on the order of 1 mW. The power of the optical channels launched by the node 1 transmitters is measured at node 2 using the optical taps positioned before and after the optical amplifier. The optical amplifier is powered up and the optical gain is increased until the average optical channel power level at the output tap reaches a predetermined level, typically on the order of 1 mW. Subsequently, the west-east optical transmitters at node 2 are turned on and set to an initial value of 1 mW. This process is repeated at each adjacent node (i.e., for the bidirectional network depicted in FIG. 1, node 2 is brought up followed by node 3 and node 4) until all of the optical transmitters in the network have been brought up. After all the transmitters are launching optical channels, the total optical power measured at the optical amplifier output at node 2 is examined. The amplifier gain is increased or decreased until the average optical signal output power is 1 mW (total measured power divided by the total number of optical channels yields the average channel power). This process is repeated at each adjacent optical node until the average output power of the optical channels at each node is 1 mW.

Next, the power of each individual optical channel is measured at the optical receiver where the channel is dropped from the network. The channel launch power is subsequently increased or decreased until the channel power at the receiver reaches the desired predetermined value, typically on the order of less than 1 mW. The launch powers of the optical transmitters and, optionally, amplifier gain levels are adjusted around the ring until the desired power levels for individual optical channels at their respective receivers are achieved.

After the launch powers and amplifier gain have been set for channels propagating in the west-east direction, the process is repeated for channels propagating in the east-west direction. Optionally, the process of setting the launch powers and amplifier gain for the east-west direction can occur simultaneously with the process of setting the launch powers and amplifier gain for the west-east direction.

Note that the power level measurements are communicated between nodes via the optical service channels; through communication with the network control element, the transmitter and launch powers may be set by the network control element to create a fully automated system.

This dynamic power adjustment occurs continuously during operation of the bidirectional optical network. In contrast, point-to-point networks do not require the extensive feedback and adjustment since all the optical channels begin at a first location and end at a second location. However, in the metropolitan rings depicted in one embodiment of the present invention, there is no "beginning" or "end" of the system as traffic is continually add-dropped along the network.

Advantageously, new nodes may be added to the bidirectional optical networks of the present invention with minimal system reconfiguration. Because the add-drop multiplexers are optically-amplified and the launch powers and amplifier gain levels controlled via the network control elements in communication with the bidirectional optical service channels, the presence of a new node causes the network control elements in each optical node to update their system information to include the presence of the new node. In an exemplary embodiment, when a new optical node is brought on line (or, similarly, when new optical channels are added at an existing optical node) the launch power of each optical transmitter is initialized as when bringing up a new system, discussed above. As in the example above, the optical power of each node is measured and amplifier and/or optical channel gain is subsequently adjusted (if necessary) node-by-node around the optical ring. The process is repeated in the opposite direction for the counter-propagating optical channels.

While the above invention has been described with reference to the particular exemplary embodiments, many modifications and functionally equivalent elements may be substituted without departing from the spirit and contributions of the present invention, namely, the provision of a bidirectional optical network carrying counterpropagating WDM optical signals. Accordingly, modifications and functionally equivalent elements such as those suggested above, but not limited thereto, are considered to be within the scope of the following claims.

What is claimed is:

1. A bidirectional wavelength division multiplexed optical communication network comprising:

a bidirectional optical waveguide carrying a first wavelength division multiplexed optical signal comprising a plurality of first optical channels propagating in a first direction and carrying a second wavelength division multiplexed optical signal comprising a plurality of second optical channels propagating in a second direction;

a bidirectional optical node comprising a bidirectional optical add-drop multiplexer optically communicating with the bidirectional optical waveguide, the bidirectional optical add-drop multiplexer including at least a first channel selector for selecting at least one optical channel from the first wavelength division multiplexed optical signal and at least a second channel selector for selecting at least one optical channel from the second wavelength division multiplexed optical signal, the bidirectional optical node further including optical amplification means for optically amplifying the first and second wavelength division multiplexed optical signals;

means for measuring optical power before and after the optical amplification means;

means for varying the optical gain of the optical amplification means;

a network control element electrically communicating with the optical power measuring means and electrically communicating with the gain varying means for controlling optical gain responsive to the optical power measuring means;

bidirectional optical service channels provided via service channel add-drop means optically communicating with an input and output of the bidirectional optical add-drop multiplexer and service channel transmitter and receiver means optically communicating with the service channel add-drop means wherein the service channel transmitter and receiver means sends information to and receives information from the network control element.

2. A bidirectional wavelength division multiplexed optical communication network as recited in claim 1 further comprising optical taps positioned before and after the optical amplification means for sending a portion of an optical signal to the means for measuring optical power.

3. A bidirectional wavelength division multiplexed optical communication network as recited in claim 2 wherein the network control element controls the gain of the optical amplification means in response to optical power measurements from the portion of the optical signal selected by the optical taps.

4. A bidirectional wavelength division multiplexed optical communication network as recited in claim 1 wherein the optical amplification means comprises a first optical amplifier for amplifying the first wavelength division multiplexed optical signal and a second optical amplifier for amplifying the second wavelength division multiplexed optical signal.

5. A bidirectional wavelength division multiplexed optical communication network as recited in claim 1 wherein the information includes the optical power level of the optical amplification means.

6. A bidirectional wavelength division multiplexed optical communication network as recited in claim 1 further comprising at least one optical transmitter optically communicating with the bidirectional optical add-drop multiplexer for supplying an optical channel to be added to the bidirectional optical waveguide.

7. A bidirectional wavelength division multiplexed optical communication network as recited in claim 1 further comprising at least one optical receiver optically communicating with the bidirectional optical add-drop multiplexer for receiving an optical channel dropped from the bidirectional optical waveguide.

8. A bidirectional wavelength division multiplexed optical communication network, comprising:

a bidirectional optical waveguide carrying a first wavelength division multiplexed optical signal comprising a plurality of first optical channels propagating in a first direction and carrying a second wavelength division multiplexed optical signal comprising a plurality of second optical channels propagating in a second direction;

a plurality of optical nodes positioned along the bidirectional optical waveguide, each optical node including a bidirectional optical add-drop multiplexer optically communicating with the bidirectional optical waveguide, the bidirectional optical add-drop multiplexer including at least a first channel selector for selecting at least one optical channel from the first wavelength division multiplexed optical signal and at least a second channel selector for selecting at least one optical channel from the second wavelength division multiplexed optical signal, the bidirectional optical add-drop multiplexer including first optical amplification means for optically amplifying the first wavelength division multiplexed optical signal and second optical amplification means for optically amplifying the second wavelength division multiplexed optical signal;

each optical node further including at least one optical transmitter for supplying an optical channel to be added by the bidirectional optical add-drop multiplexer to the bidirectional optical waveguide and further including at least one optical receiver for receiving an optical channel dropped from the bidirectional optical waveguide by the bidirectional add-drop multiplexer;

a network control element communicating with the first and second optical amplification means for controlling the gain of the optical amplification means and communicating with the at least one optical transmitter for controlling an optical launch power of the optical transmitter;

bidirectional optical service channels provided via service channel add-drop means optically communicating with an input and output of the bidirectional optical add-drop multiplexer and service channel transmitter and receiver means optically communicating with the service channel add-drop means wherein the service channel transmitter and receiver means sends information to and receives information from the network control element.

9. A bidirectional wavelength division multiplexed optical communication network as recited in claim 8 wherein the information includes the gain of the optical amplification means.

10. A bidirectional wavelength division multiplexed optical communication network as recited in claim 9 wherein the information includes the optical launch power of the at least one optical transmitter.

* * * * *